United States Patent
Ruggieri et al.

(10) Patent No.: US 11,813,661 B2
(45) Date of Patent: Nov. 14, 2023

(54) MACHINE AND METHOD FOR PROCESSING A CONTINUOUS SEMI-PROCESSED PRODUCT

(71) Applicant: TECNOMATIC SPA, Corropoli (IT)

(72) Inventors: Giovanni Ruggieri, Corropoli (IT); Graziano Di Marcangelo, Corropoli (IT)

(73) Assignee: TECNOMATIC SPA, Corropoli (IT)

( * ) Notice: Subject to any disclaimer, the term of this patent is extended or adjusted under 35 U.S.C. 154(b) by 681 days.

(21) Appl. No.: 16/758,466

(22) PCT Filed: Dec. 5, 2017

(86) PCT No.: PCT/IB2017/057641
§ 371 (c)(1),
(2) Date: Apr. 23, 2020

(87) PCT Pub. No.: WO2019/111039
PCT Pub. Date: Jun. 13, 2019

(65) Prior Publication Data
US 2020/0338626 A1    Oct. 29, 2020

(51) Int. Cl.
*B21F 23/00* (2006.01)
*B21F 11/00* (2006.01)

(52) U.S. Cl.
CPC .............. *B21F 23/00* (2013.01); *B21F 11/00* (2013.01)

(58) Field of Classification Search
CPC ............. B21F 23/00; B21F 11/00; B21F 5/00
USPC ....................................................... 140/139
See application file for complete search history.

(56) References Cited

U.S. PATENT DOCUMENTS

| | | | |
|---|---|---|---|
| 2,929,136 A * | 3/1960 | Andren .................. | B21F 11/00 226/122 |
| 7,480,987 B1 * | 1/2009 | Guercioni .......... | H02K 15/0421 29/874 |
| 2015/0052736 A1 | 2/2015 | Hayashi | |

FOREIGN PATENT DOCUMENTS

JP         4301739         7/2009

OTHER PUBLICATIONS

International Search Report and Written Opinion of the International Searching Authority, PCT/IB2017/057641 European Patent Office, dated Jul. 31, 2018.

* cited by examiner

*Primary Examiner* — Adam J Eiseman
*Assistant Examiner* — Fred C Hammers
(74) *Attorney, Agent, or Firm* — Valauskas Corder LLC

(57) ABSTRACT

A machine for processing a continuous semi- processed product (W), comprising a feeding unit (10), a processing unit (21, 22, 23), and a terminal cutting unit (30) past which processed segments (M) of the semi-processed product (W) are producible, which width (LI, L2, L3) is correlated to the feed step. The feeding unit (10) is automatically adjustable in the feed step. The machine further comprises actuators (21*a*, 22*a*, 23*a*) configured to adjust the position of the processing unit along the feed direction (A) of the semi-processed product (W), and a control system (40) configured to read input instructions relating to a series of consecutive segments to be produced, determine the required position of the processing unit (21, 22, 23) as a function of the input instructions, and determine the required feed step as a function of the input instructions.

6 Claims, 2 Drawing Sheets

MACHINE AND METHOD FOR PROCESSING A CONTINUOUS SEMI-PROCESSED PRODUCT

DESCRIPTION

Figure 1:
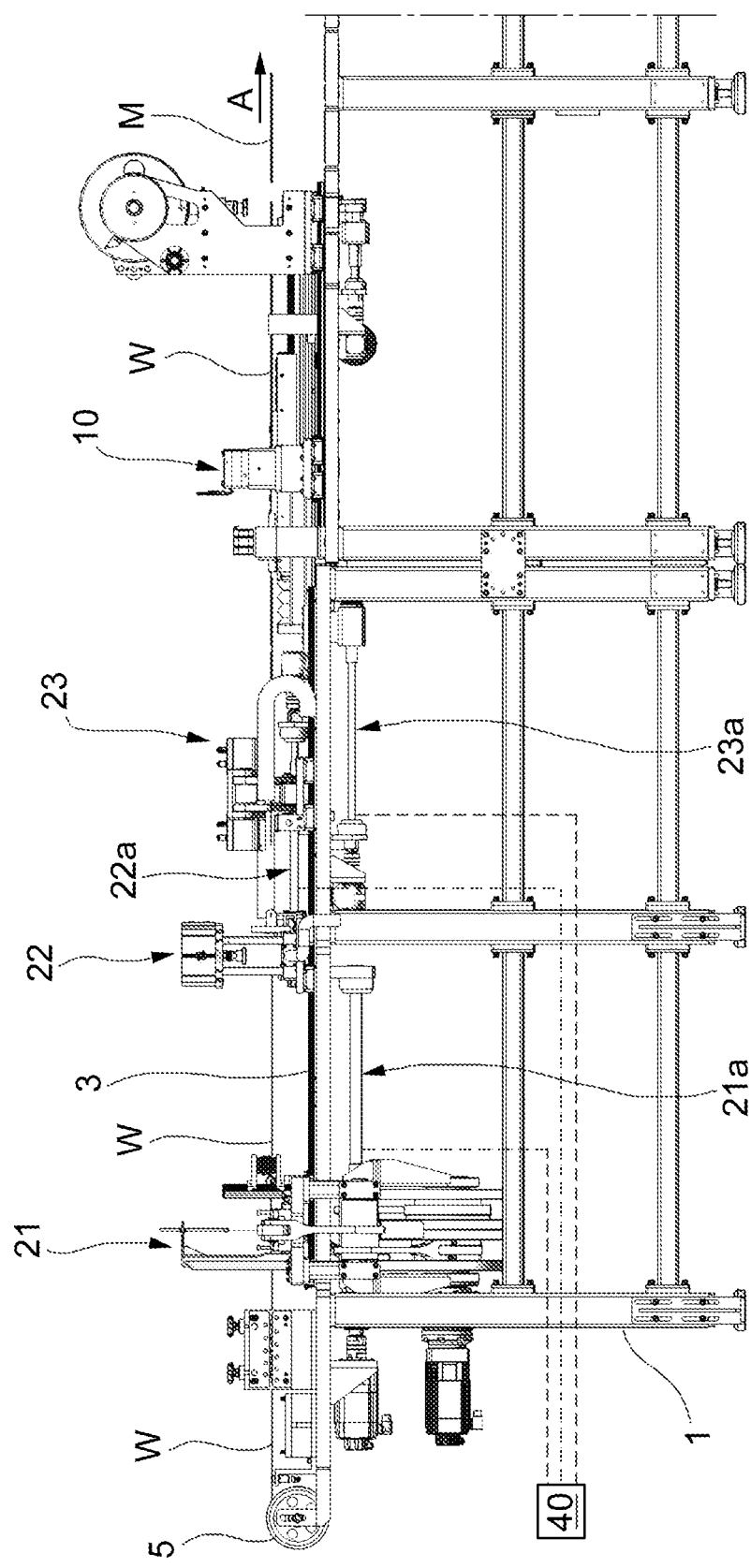

The present invention in general relates to the technologies for processing continuous semi-processed products fed from a bobbin, for example of conductive rods or wires coated with insulating material intended for making electric machines.

In particular, the present invention relates to a machine for processing a continuous semi-processed product, comprising a feeding unit configured to move the semi-processed product forward along a feed direction, according to a feed step, at least one processing unit configured to process the semi-processed product when moving forward, the processing unit being located in a respective position along the feed direction of the semi-processed product, and a terminal cutting unit following the processing unit in the feed direction of the semi-processed product, and past which processed segments of the semi-processed product are producible, which length is correlated to the feed step.

The existing technology based on the fixed positioning of processing units allows processing:

i. segments of conductor element all equal to one another in the case of continuous feed steps having constant width. To change the processing sizes (lengths), there is a need to reconfigure the machine and therefore to stop it to allow repositioning the processing units;

ii. segments of conductor element which are different from one another in the case of feed steps with intermediate stops.

This constitutes a limit of the process productivity.

It is an object of the present invention to propose a machine capable of obviating the drawbacks indicated above.

With respect to such an object, a machine of the type defined above is an object of the invention, in which the feeding unit is automatically adjustable in the feed step, the machine further comprising:

actuating means configured to adjust the position of the processing unit along the feed direction of the semi-processed product, and control means configured to read input instructions relating to a series of consecutive processed segments to be produced, determine the required position of the processing unit as a function of the input instructions, and determine the required feed step as a function of the input instructions.

According to one embodiment, said at least one processing unit comprises a plurality of movable processing units arranged in succession along the feed direction of the semi-processed product.

The present invention was conceived in particular for processing a semi-processed product consisting of a continuous rod or wire of electrically conducting material coated with a sleeve of insulating material.

Here, said at least one processing unit may comprise at least one peeling unit provided to remove the sleeve of insulating material in areas corresponding to transversely opposite faces of the semi-processed product, and/or at least one coining unit provided to flatten the semi-processed product along a direction orthogonal to the feed direction.

The invention in any case is not limited to processing this type of semi-processed product.

A method for processing a continuous semi-processed product is also an object of the invention, the method comprising the following steps:

moving the semi-processed product forward along a feed direction, according to a feed step, processing the semi-processed product moving forward by means of at least one processing unit, and producing processed segments of the semi-processed product by means of a terminal cutting unit following the processing unit in the feed direction of the semi-processed product, the length of the processed segments being correlated to the feed step, in which the feed step and the position of the processing unit along the feed direction of the semi-processed product are automatically adjustable, in which the method further comprises the following steps:

reading input instructions relating to a series of consecutive segments to be produced, determining the required position of the processing unit as a function of the input instructions, and determining the required feed step as a function of the input instructions.

The machine and method according to the invention allow processed segments to be produced, in particular segments of conductor elements, with various lengths and various processing operations in a continuous manner on a same machine, therefore without requiring stopping the machine itself.

Figure 2:
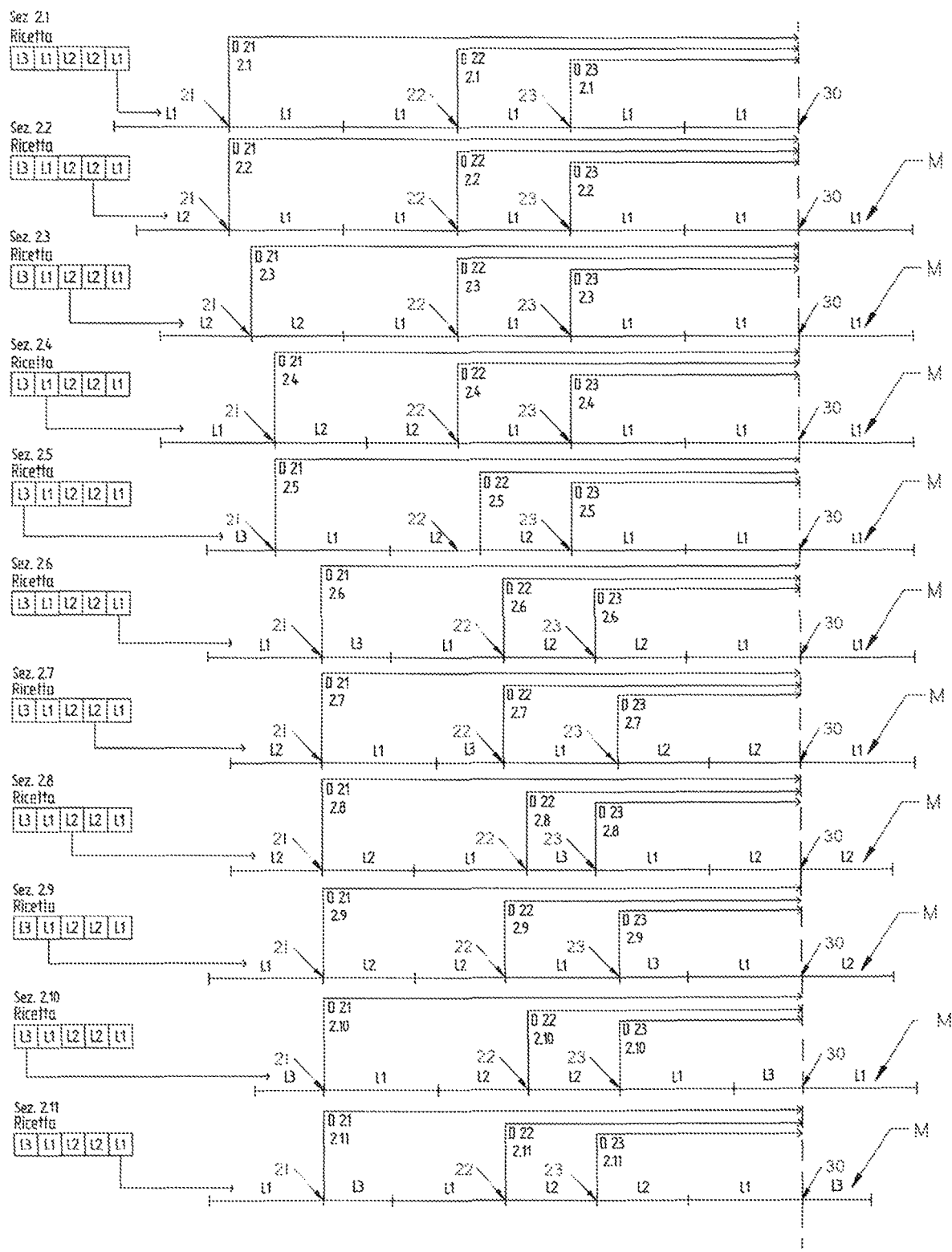

Further features and advantages of the method and of the machine according to the invention shall be more apparent with the following detailed description of an embodiment of the invention, made with reference to the accompanying drawings, which are provided by mere way of non-limiting example, in which FIG. 1 is a side elevation view depicting a machine according to the invention, and FIG. 2 is a time diagram depicting a processing sequence of a lot of consecutive segments having different lengths, and therefore with several variations of the feed step in the machine in FIG. 1.

FIG. 1 depicts a machine for processing a continuous semi-processed product, in particular for processing a continuous rod or wire of electrically conducting material coated with a sleeve of insulating material.

The machine comprises a supporting frame 1, at the top of which is obtained a processing path 3, along which the continuous semi-processed product W is moved forward according to a feed direction indicated by arrow A. In the example illustrated, the semi-processed product W is unwound from a bobbin 5.

The machine illustrated further comprises a feeding unit or station 10 configured to move the semi-processed product W forward along the feed direction A according to a feed step which may be varied, as is clarified later. The feeding unit 10 may comprise for example, drive rollers which engage the outer surface of the semi-processed product and which movement induces the semi-processed product W to move forward. According to other embodiments suitable for other types of semi-processed product, the feeding unit may consist of for example, a conveyor belt or similar conveyor device.

The machine further comprises at least one processing unit or station configured to process the semi-processed product W moving forward in direction A. In the example illustrated, the machine comprises a horizontal peeling unit 21, a vertical peeling unit 22 and a coining unit 23 arranged in succession along the feed direction A of the semi-processed product W. The horizontal peeling unit 21 conventionally is provided to remove the sleeve of insulating material in corresponding areas at opposite faces of the semi-processed product W, with respect to a horizontal transverse direction. The vertical peeling unit 22 conventionally is provided to remove the sleeve of insulating material in areas corresponding to opposite faces of the semi-processed product W, with respect to a vertical transverse direction. The coining unit 23 conventionally is provided to flatten the semi-processed product W along a direction orthogonal to the feed direction A. Each of the aforesaid units 21, 22, 23 is associated with a respective translation unit 21a, 22a, 23a provided to move the corresponding unit 21, 22, 23 in a direction parallel to the feed direction A of the semi-processed product W. To this end, each translation unit 21a, 22a, 23a may comprise a linear actuator with position control.

The machine further comprises a terminal cutting unit or station 30 arranged past the last of the processing units 23 in the feed direction A of the semi-processed product W. The cutting unit conventionally is provided to obtain separate processed segments M from rod or wire W. The length of the processed segments is variable and depends on the processing sequence set. The cutting unit 30 cuts the semi-processed product W in the pause between one feed step and the successive one. During the processing of the semi-processed product W, the distance of each of the processing units 21, 22, 23 from the terminal cutting unit 30 is calculated in real time by a control system 40 provided to control the operation of the various units of the machine.

The control system 40 uses an algorithm capable of modeling and managing the continuous flow of material W in the machine.

The algorithm processes the information on a static data structure (which later is also called "recipe") and conveniently enters it into a dynamic structure ("dynamic buffer") which models the flow of material W in real time on the various units and between them. The object is to obtain instantaneous processing parameters for the individual units according to the segment of material W instantaneously on each unit and according to the segments that proceeded it.

The static data structure or "recipe" may contain the following information:
Overall number of possible segments M to be produced;
Logic position of the individual processing units within the dynamic buffer structure (fixed value).
Each segment in turn is modeled through a data structure consisting for example, of:
Identification number
Type
Overall length
Enabling of individual operations (horizontal, side peeling, coining, cutting)

An initialization process initially loads the "dynamic buffer" with default values.

A "shift" process slides the "dynamic buffer" by one step and models the feed step which drags the "wire" forward. The "shift" prepares the processing data for all the stations consistently with the segment at that step on each station.

Once the new data have been obtained, each station moves to the processing position; then it performs the specific processing, when required.

Each processing position is obtained from a calculation that takes into consideration the length of all the segments in that instant between the cutting position and the station considered. By assessing the absolute distance between origin of the reference system of the station involved and the cutting, the value of the relative movement for that processing step is obtained.

The algorithm may also manage other functionalities, such as:
Automatic recall of the production of an individual test segment after "n" pieces
Assessment of the correct processing result of the individual segments for rejecting those segments with processing defects at the cutting time With reference to FIG. 2, a possible example of automatic production procedure of a predefined sequence of 5 segments M having length L1, L2, L2, L1 and L3, respectively, is now described. The sections 2.1-2.11 of such a drawing depict successive feed steps of material W.

Section 2.1 of FIG. 2 depicts the machine, in which the processing units 21, 22 and 23 are positioned so as to produce all segments of length L1 (start or "default" condition); in this condition, the first element of the recipe, L1, is loaded at the dynamic buffer input. The following table depicts the distances of the processing units from the cutting unit (and therefore the positions of the processing units with respect to the reference depicted by the cutting unit) in this starting step. The generic reference "Dxx-yy" in this table and in the following ones, as well as in FIG. 2, designates the distance of the processing unit "xx" from the cutting unit in the step depicted by section "yy".

| Section 2.1: unit distances – cutting | |
|---|---|
| D21 – 2.1 | L1 + L1 + L1 + L1 + L1 |
| D22 – 2.1 | L1 + L1 + L1 |
| D23 – 2.1 | L1 + L1 |

In section 2.2 of FIG. 2, the shift of the dynamic buffer is performed and the semi-processed product W is moved forward by a length L1. The segment of material W which now is downstream of the cutting unit 30 is cut, thus obtaining a processed segment M; such a segment M was subjected to processing by the units 21, 22 and 23 during steps preceding section 2.1, and not depicted in FIG. 2. At the end of the semi-processed product moving forward, the segments upstream of the cut segment are subjected to the possible respective processing operations by the units 21, 22 and 23, which were positioned, according to calculations made by the control system 40 and indicated in the table below, during the step of the semi-processed product W moving forward.

| Section 2.2: unit distances – cutting | |
|---|---|
| D21 – 2.2 | L1 + L1 + L1 + L1 + L1 |
| D22 – 2.2 | L1 + L1 + L1 |
| D23 – 2.2 | L1 + L1 |

Moreover, a segment of length L2 was "loaded" at the end in compliance with the processing sequence set in the recipe.

In section 2.3 of FIG. 2, the shift of the dynamic buffer is performed and the semi-processed product W is moved forward by a length L1. The segment of material W which now is downstream of the cutting unit 30 is cut, thus obtaining a processed segment M; such a segment M was subjected to processing by the units 21 and 22 during steps preceding section 2.1 not depicted in FIG. 2, and by unit 23 during the step of section 2.1 At the end of the semi-processed product moving forward, the segments upstream of the cut segment are subjected to the possible respective processing operations by the units 21, 22 and 23, which were positioned, according to calculations made by the control system 40 and indicated in the table below, during the step of the semi-processed product W moving forward.

| Section 2.3: unit distances – cutting | |
| --- | --- |
| D21 – 2.3 | L2 + L1 + L1 + L1 + L1 |
| D22 – 2.3 | L1 + L1 + L1 |
| D23 – 2.3 | L1 + L1 |

Moreover, a segment of length L2 was "loaded" at the end in compliance with the processing sequence set in the recipe.

In section 2.4 of FIG. 2, the shift of the dynamic buffer is performed and the semi-processed product W is moved forward by a length L1. The segment of material W which now is downstream of the cutting unit 30 is cut, thus obtaining a processed segment M; such a segment M was subjected to processing by the units:
- 21 during steps preceding section 2.1 and not depicted in FIG. 2;
- 22 during the step of section 2.1;
- 23 during the step of section 2.2.

At the end of the semi-processed product moving forward, the segments upstream of the cut segment are subjected to the possible respective processing operations by the units 21, 22 and 23, which were positioned, according to calculations made by the control system 40 and indicated in the table below, during the step of the semi-processed product W moving forward.

| Section 2.4: unit distances – cutting | |
| --- | --- |
| D21 – 2.4 | L2 + L2 + L1 + L1 + L1 |
| D22 – 2.4 | L1 + L1 + L1 |
| D23 – 2.4 | L1 + L1 |

Moreover, a segment of length L1 was "loaded" at the end in compliance with the processing sequence set in the recipe.

In section 2.5 of FIG. 2, the shift of the dynamic buffer is performed and the semi-processed product W is moved forward by a length L1. The segment of material W which now is downstream of the cutting unit 30 is cut, thus obtaining a processed segment M; such a segment M was subjected to processing by the units:
- 21 during steps preceding section 2.1 and not depicted in FIG. 2;
- 22 during the step of section 2.2;
- 23 during the step of section 2.3.

At the end of the semi-processed product moving forward, the segments upstream of the cut segment are subjected to the possible respective processing operations by the units 21, 22 and 23, which were positioned, according to calculations made by the control system 40 and indicated in the table below, during the step of the semi-processed product W moving forward.

| Section 2.5: unit distances – cutting | |
| --- | --- |
| D21 – 2.5 | L1 + L2 + L2 + L1 + L1 |
| D22 – 2.5 | L2 + L1 + L1 |
| D23 – 2.5 | L1 + L1 |

Moreover, the last segment of length L3 of the sequence to be processed according to the recipe, was "loaded" at the end.

In section 2.6 of FIG. 2, the shift of the dynamic buffer is performed and the semi-processed product W is moved forward by a length L1. The segment of material W which now is downstream of the cutting unit 30 is cut, thus obtaining a processed segment M; such a segment M was subjected to processing by the units:
- 21 during the step of section 2.1;
- 22 during the step of section 2.3;
- 23 during the step of section 2.4.

At the end of the semi-processed product moving forward, the segments upstream of the cut segment are subjected to the possible respective processing operations by the units 21, 22 and 23, which were positioned, according to calculations made by the control system 40 and indicated in the table below, during the step of the semi-processed product W moving forward.

| Section 2.6: unit distances – cutting | |
| --- | --- |
| D21 – 2.6 | L3 + L1 + L2 + L2 + L1 |
| D22 – 2.6 | L2 + L2 + L1 |
| D23 – 2.6 | L2 + L1 |

Moreover, a segment of length L1 was "loaded" again at the end, first element of the recipe. The production cycle starts again in compliance with the processing sequence set in the recipe.

In section 2.7 of FIG. 2, the shift of the dynamic buffer is performed and the semi-processed product W is moved forward by a length L1. The segment of material W which now is downstream of the cutting unit 30 is cut, thus obtaining a processed segment M; such a segment M was subjected to processing by the units:
- 21 during the step of section 2.2;
- 22 during the step of section 2.4;
- 23 during the step of section 2.5.

Segment M of length L1 produced in this section is element L1 loaded at section 2.1 as first element picked from the recipe and loaded in the buffer.

At the end of the semi-processed product moving forward, the segments upstream of the cut segment are subjected to the possible respective processing operations by the units 21, 22 and 23, which were positioned, according to calculations made by the control system 40 and indicated in the table below, during the step of the semi-processed product W moving forward.

| Section 2.7: unit distances – cutting | |
| --- | --- |
| D21 – 2.7 | L1 + L3 + L1 + L2 + L2 |
| D22 – 2.7 | L1 + L2 + L2 |
| D23 – 2.7 | L2 + L2 |

Moreover, a segment of length L2 was "loaded" again at the end, second element of the recipe.

In section 2.8 of FIG. 2, the shift of the dynamic buffer is performed and the semi-processed product W is moved forward by a length L2. The segment of material W which now is downstream of the cutting unit 30 is cut, thus obtaining a processed segment M; such a segment M was subjected to processing by the units:
- 21 during the step of section 2.3;
- 22 during the step of section 2.5;

23 during the step of section 2.6.

Segment M of length L2 produced in this section is element L2 loaded at section 2.2 as second element picked from the recipe and loaded in the buffer.

At the end of the semi-processed product moving forward, the segments upstream of the cut segment are subjected to the possible respective processing operations by the units 21, 22 and 23, which were positioned, according to calculations made by the control system 40 and indicated in the table below, during the step of the semi-processed product W moving forward.

| Section 2.8: unit distances – cutting | |
|---|---|
| D21 – 2.8 | L2 + L1 + L3 + L1 + L2 |
| D22 – 2.8 | L3 + L1 + L2 |
| D23 – 2.8 | L1 + L2 |

Moreover, a segment of length L2 was "loaded" again at the end, third element of the recipe.

In section 2.9 of FIG. 2, the shift of the dynamic buffer is performed and the semi-processed product W is moved forward by a length L2. The segment of material W which now is downstream of the cutting unit 30 is cut, thus obtaining a processed segment M; such a segment M was subjected to processing by the units:

21 during the step of section 2.4;
22 during the step of section 2.6;
23 during the step of section 2.7.

Segment M of length L2 produced in this section is element L2 loaded at section 2.3 as third element picked from the recipe and loaded in the buffer.

At the end of the semi-processed product moving forward, the segments upstream of the cut segment are subjected to the possible respective processing operations by the units 21, 22 and 23, which were positioned, according to calculations made by the control system 40 and indicated in the table below, during the step of the semi-processed product W moving forward.

| Section 2.9: unit distances – cutting | |
|---|---|
| D21 – 2.9 | L2 + L2 + L1 + L3 + L1 |
| D22 – 2.9 | L1 + L3 + L1 |
| D23 – 2.9 | L3 + L1 |

Moreover, a segment of length L1 was "loaded" again at the end, fourth element of the recipe.

In section 2.10 of FIG. 2, the shift of the dynamic buffer is performed and the semi-processed product W is moved forward by a length L1. The segment of material W which now is downstream of the cutting unit 30 is cut, thus obtaining a processed segment M; such a segment M was subjected to processing by the units:

21 during the step of section 2.5;
22 during the step of section 2.7;
23 during the step of section 2.8.

Segment M of length L1 produced in this section is element L1 loaded at section 2.4 as fourth element picked from the recipe and loaded in the buffer.

At the end of the semi-processed product moving forward, the segments upstream of the cut segment are subjected to the possible respective processing operations by the units 21, 22 and 23, which were positioned, according to calculations made by the control system 40 and indicated in the table below, during the step of the semi-processed product W moving forward.

| Section 2.10: unit distances – cutting | |
|---|---|
| D21 – 2.10 | L1 + L2 + L2 + L1 + L3 |
| D22 – 2.10 | L2 + L1 + L3 |
| D23 – 2.10 | L1 + L3 |

Moreover, a segment of length L3 was "loaded" again at the end, fifth element of the recipe.

In section 2.11 of FIG. 2, the shift of the dynamic buffer is performed and the semi-processed product W is moved forward by a length L3. The segment of material W which now is downstream of the cutting unit 30 is cut, thus obtaining a processed segment M; such a segment M was subjected to processing by the units:

21 during the step of section 2.6;
22 during the step of section 2.8;
23 during the step of section 2.9.

Segment M of length L3 produced in this section is element L3 loaded at section 2.5 as fifth and last element picked from the recipe and loaded in the buffer.

At the end of the semi-processed product moving forward, the segments upstream of the cut segment are subjected to the possible respective processing operations by the units 21, 22 and 23, which were positioned, according to calculations made by the control system 40 and indicated in the table below, during the step of the semi-processed product W moving forward.

| Section 2.11: unit distances – cutting | |
|---|---|
| D21 – 2.11 | L3 + L1 + L2 + L2 + L1 |
| D22 – 2.11 | L2 + L2 + L1 |
| D23 – 2.11 | L2 + L1 |

Moreover, a segment of length L1 was "loaded" again at the end, first element of the recipe.

The process continues up to a possible change of recipe.

A further development of the system described above consists in enslaving the machine at the dynamic production request of segments by other systems instead of a static recipe containing a predetermined sequence of segments.

The invention claimed is:

1. A machine for processing a continuous semi-processed product, comprising
   a feeding unit configured to move the semi-processed product forward along a feed direction, according to a feed step,
   at least one processing unit configured to process the semi-processed product when moving forward, the processing unit being located in a respective position along the feed direction of the semi-processed product, and
   a terminal cutting unit following the processing unit in the feed direction of the semi-processed product, and past which processed segments of the semi-processed product are producible, whose length is correlated to the feed step, wherein the terminal cutting unit cuts the semi-processed product in pauses between successive feed steps, wherein the feeding unit is automatically adjustable in feed step, the machine further comprising:
an actuator configured to adjust the position of the processing unit along the feed direction of the semi-processed product, and
a controller configured to
read input instructions relating to a series of consecutive processed segments to be produced,
determine a required position of the processing unit as a function of the input instructions, and move the processing unit to the required position, during a step of the semi-processed product moving forward, and
determine the required feed step as a function of the input instructions,
wherein the processing unit is configured to process the semi-processed product at the end of the step of the semi-processed product moving forward.

2. A machine according to claim 1, wherein said at least one processing unit comprises a plurality of processing units arranged in succession along the feed direction of the semi-processed product.

3. A machine according to claim 2, wherein the semi-processed product is a continuous rod or wire of electrically conducting material coated with a sleeve of insulating material.

4. A machine according to claim 3, wherein said at least one processing unit comprises at least one peeling unit provided for removing the sleeve of insulating material.

5. A machine according to claim 3, wherein said at least one processing unit comprises at least one coining unit provided for flattening the semi-processed product along a direction orthogonal to the feed direction.

6. A method for processing a continuous semi-processed product, comprising the following steps:
moving the semi-processed product forward along a feed direction, according to a feed step,
processing the semi-processed product when moving forward by means of at least one processing unit, the processing unit being located in a respective position along the feed direction of the semi-processed product, and
producing processed segments of the semi-processed product by means of a terminal cutting unit following the processing unit in the feed direction of the semi-processed product, the length of the processed segments being correlated to the feed step, wherein the terminal cutting unit cuts the semi-processed product in pauses between successive feed steps,
wherein the feed step and the position of the processing unit along the feed direction of the semi-processed product are automatically adjustable,
wherein the method further comprises the following steps:
reading input instructions relating to a series of consecutive segments to be produced,
determining a required position of the processing unit as a function of the input instructions, and moving the processing unit to the required position, during a step of the semi-processed product moving forward, and
determining the required feed step as a function of the input instructions,
wherein the processing unit is configured to process the semi-processed product at the end of the step of the semi-processed product moving forward.

* * * * *